United States Patent [19]
Yoshida

[11] Patent Number: 5,402,398
[45] Date of Patent: Mar. 28, 1995

[54] DIGITAL DATA PROCESSING APPARATUS CAPABLE OF CONVERTING CD-DA AUDIO DATA INTO BLOCKS

[75] Inventor: Takuji Yoshida, Yokohama, Japan

[73] Assignee: Kabushiki Kaisha Toshiba, Kawasaki, Japan

[21] Appl. No.: 971,835

[22] Filed: Apr. 16, 1993

[30]  Foreign Application Priority Data

Jun. 17, 1991 [JP] Japan ................... 3-144559

[51] Int. Cl.⁶ .................................. G11B 17/22
[52] U.S. Cl. ................................ 369/32; 369/59; 360/51
[58] Field of Search .............. 369/59, 32, 48, 30; 360/36.1, 36.2, 35.1, 48, 49, 51, 37.1, 38.1

[56]  References Cited

U.S. PATENT DOCUMENTS

| | | | |
|---|---|---|---|
| 4,398,224 | 8/1983 | Watanabe | 360/36.2 |
| 4,403,261 | 9/1983 | Tanaka | 360/13 |
| 4,823,196 | 4/1989 | Goddard | 360/35.1 |
| 5,172,357 | 12/1992 | Taguchi | 360/36.1 |
| 5,204,787 | 4/1993 | Suzuki et al. | 360/36.1 |

FOREIGN PATENT DOCUMENTS 60-52960  3/1985  Japan .
60-74157  4/1985  Japan .
2-598112  2/1990  Japan .

*Primary Examiner*—Robert J. Pascal
*Assistant Examiner*—Tan Dinh
*Attorney, Agent, or Firm*—Cushman Darby & Cushman

[57]  ABSTRACT

The present invention relates to a digital data processing apparatus for transferring digital data which is reproduced at a disc reproduction section to, together with address information, a host processing section in a block unit. When a block signal is generated at a position exceeding a range of a time-base variation of the address information caused by jitters and the address information prior to the generation of the block signal is added to main digital data, the address information is added to each block at all times, whereby it is possible to prevent the block from being dropped out, without being transferred to the host processing section, and two addresses from being allocated to the same block. It is possible to perform a continuous data reproduction in an accurate block/address correspondence relation.

4 Claims, 8 Drawing Sheets

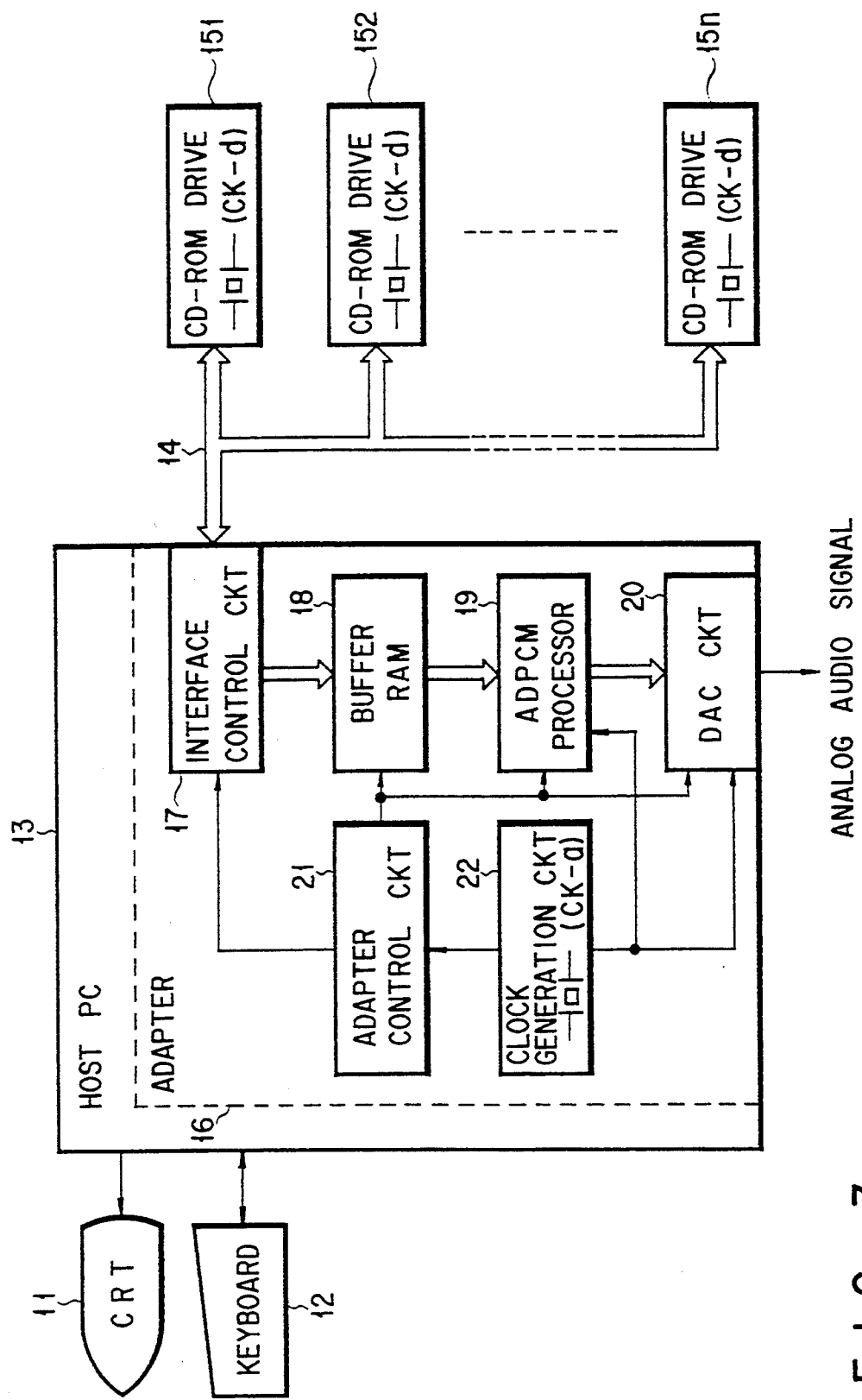
F I G. 3

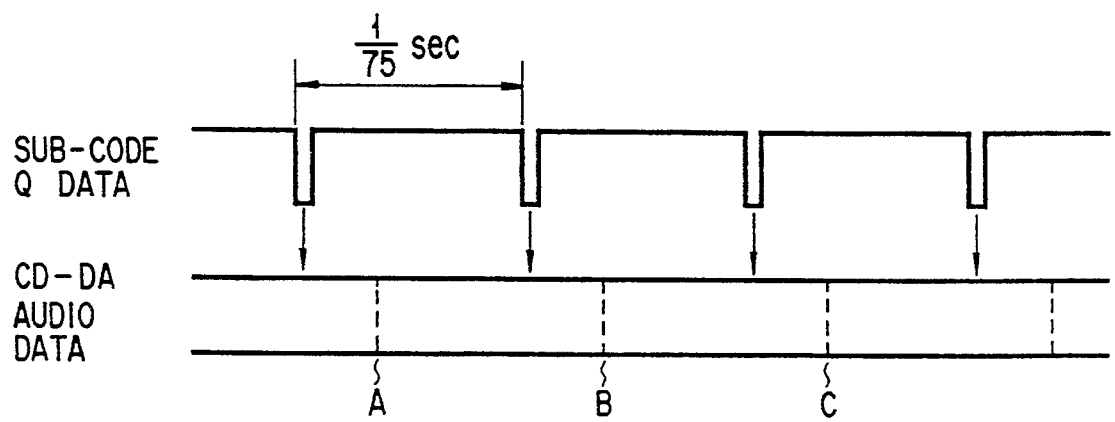
F I G. 4
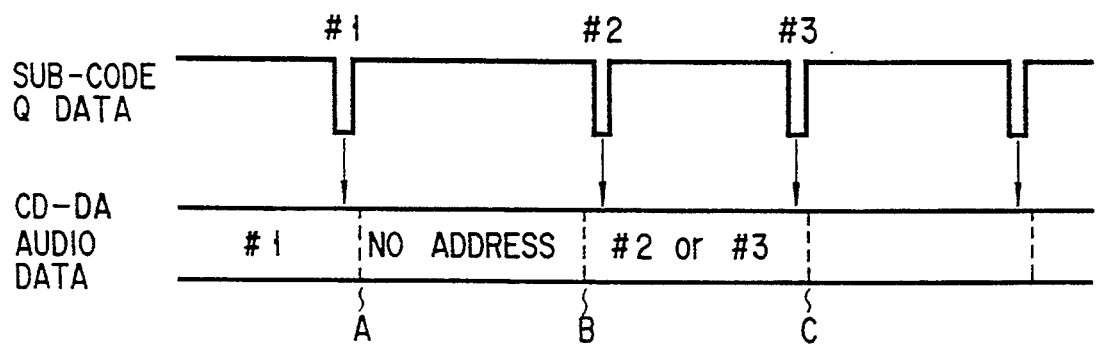
F I G. 5

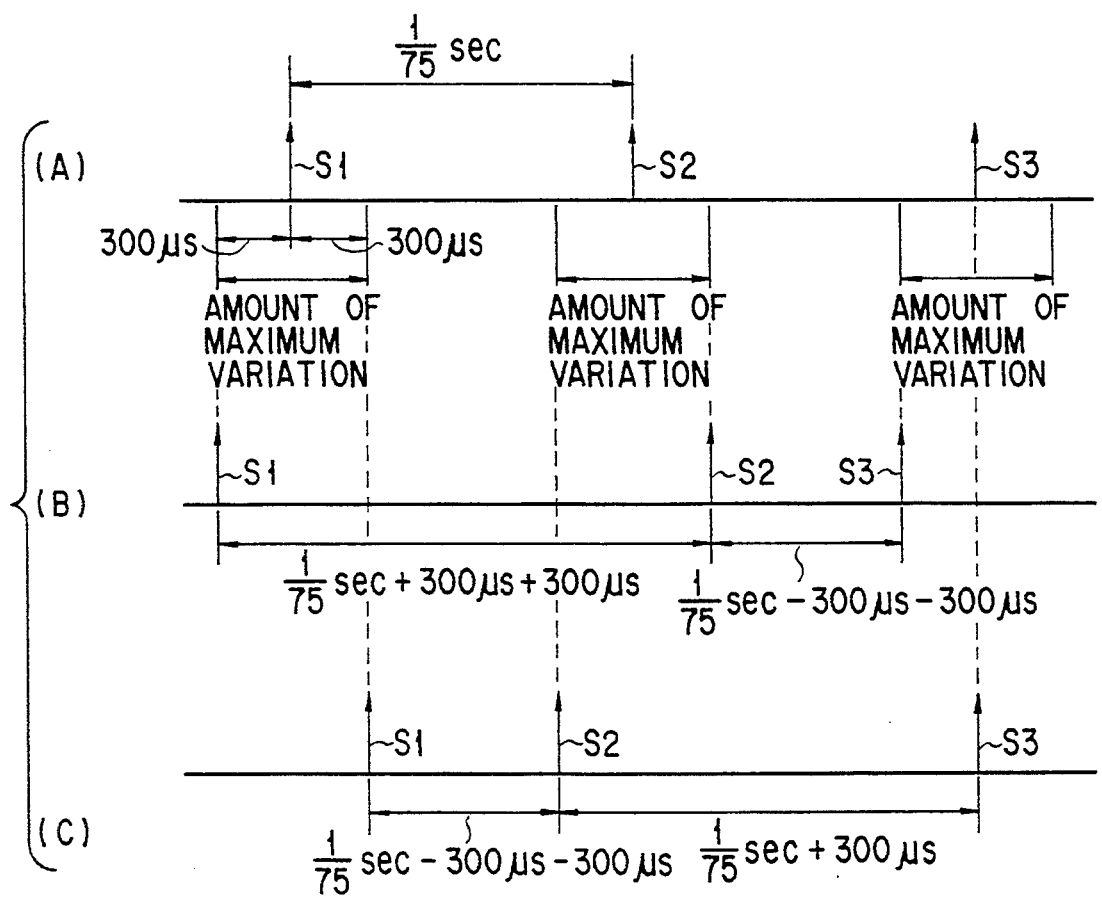
F I G. 6

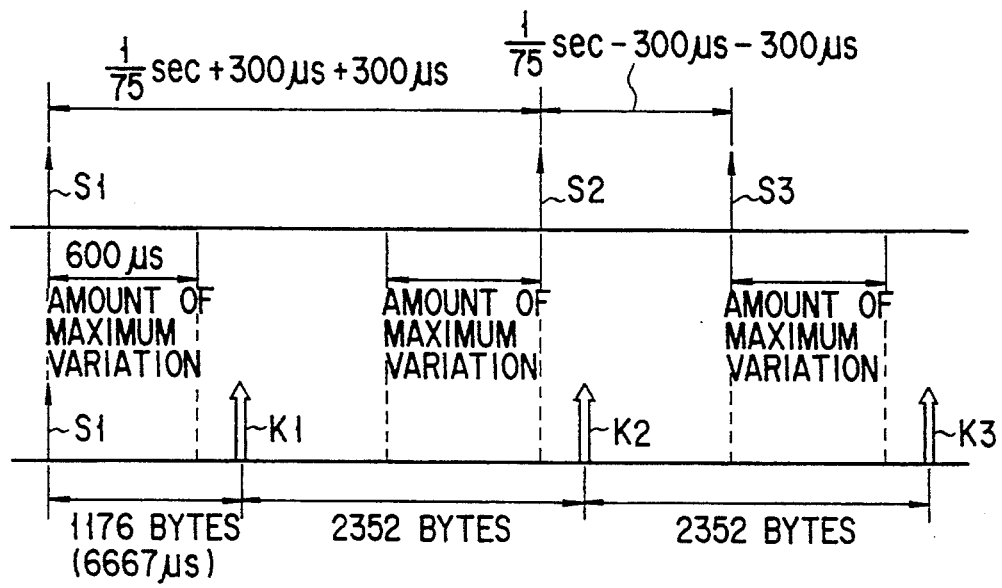
F I G. 9
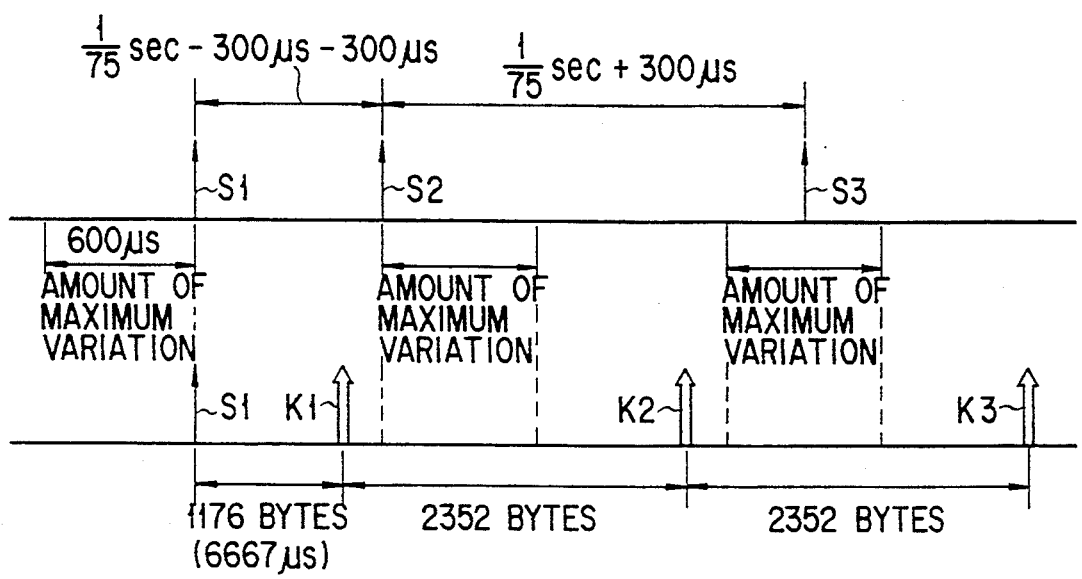
F I G. 10

DIGITAL DATA PROCESSING APPARATUS CAPABLE OF CONVERTING CD-DA AUDIO DATA INTO BLOCKS

TECHNICAL FIELD

The present invention relates to a digital data processing apparatus for transferring digital data which is output from a disc reproduction section to a host processing section.

BACKGROUND ART

As known in the art, the CD (compact disc) system currently employed as a main-current acoustic apparatus is of such a type that pits are formed in a 12 cm-diameter disc in a manner to correspond to digital PCM (pulse code modulation) data and reproduction is performed by, while rotating the disc in a drive rotation in a CLV (constant linear velocity) system, linearly tracking the data from an inner periphery side to an outer periphery side on the disc by a semiconductor laser and an optical pickup built in a photoelectric conversion element.

Audio playback musical tone data and sub-code data P, Q, R~W defined for control/display are recorded in the disc. Of the aforementioned data, the sub-code Q is also called as address data and represents, in a program area containing disc's musical tone data, a program number (TNO) of recorded musical tone data, a phrase number (INDEX), a lapse time (TIME) for each program, a total time (ATIME) lapsing from a start position of the program area, etc.

Further, the aforementioned sub-code data Q represents, in a lead-in area located on the inner periphery side of the program area, a start address of each program as TOC (table of contents) data. That is, the sub-code data Q is recorded for implementing a search operation, accurately at high speeds, for selective reproduction of playback data from vast information recorded in the disc to enable a stereo reproduction to be performed for about one hour and for grasping the sate of a reproduction on the disc.

The CD system has initially been developed so as to record and reproduce musical data. In recent years, with attention paid to such a vast recording capacity, a CD-ROM (read only memory) system is determined to be used as a read-only data recording medium for the disc through the use of a musical data recording area of the disc as a digital information recording area. The CD-ROM system is of such a type as to record and reproduce digital information on the disc without varying a recording/reproduction format for musical data reproduction in the CD system and to do so by adding a new format thereto.

In the conventional digital data processing system using the CD-ROM system, however, a disc reproduction section performs a reproduction on a disc where main digital data is recorded together with address data and outputs resultant main digital data to a host processing unit in a manner to be divided into a block unit corresponding to address data with the address data allocated to each block. If, therefore, the address data varies, by jitters, in a time-base direction, then no block-/address data correspondence is obtained and a non-address-allocated block is not transferred to the host processing section, failing to perform a continuous data reproduction and presenting a problem.

The present invention is achieved with consideration paid to the aforementioned situation and the object of the present invention is to provide an excellent digital data processing apparatus which can perform a continuous data reproduction in an accurate block/address data correspondence relation.

DISCLOSURE OF INVENTION

A digital data processing apparatus of the present invention includes a digital data processing apparatus including a disc reproduction section for performing a reproduction, based on a predetermined clock, on a disc where main digital data is recorded together with address information and for outputting the reproduced main digital data, together with the address information, with a block unit corresponding to the address information and a host processing section for allowing an output of the disc reproduction section to be transferred thereto and performing a predetermined data processing, characterized by comprising: detecting means for detecting the address information reproduced at the disc reproduction section; and block signal generating means for generating a block signal, through the counting of the clock, in a range exceeding a maximum time-base variation caused by a jitter of the address information detected by the detecting means but not reaching a range in which the next address information is generated and for sequentially generating a block signal for each position one block from a position where the block signal is generated, in which, for each block upon transfer from the disc reproduction section to the host processing section on the basis of the block signal, the address information is added.

That is, since the address information and block signal are generated in an alternate fashion, if the address information prior to the generation of the block signal is allocated to the main digital data, the address information is allocated to the respective block at all times, whereby it is possible to prevent the block from being dropped out, without being transferred to the host processing section, or two addresses from being allocated to the same block. It is, therefore, possible to perform a continuous data reproduction in an accurate block/address correspondence relation.

BRIEF DESCRIPTION OF THE DRAWINGS

FIG. 3 is a block diagram showing one form of a digital data processing system to which the present invention is applied;

FIG. 4 is a view showing a data block/address correspondence in the digital data processing system;

FIG. 5 is a view for explaining a problem involved in the same digital data processing system;

FIG. 6 is a view for explaining a principle on which the present invention is based;

FIG. 9 shows one form of a practical operation of the same embodiment; and

FIG. 10 shows another form of a practical operation of the same embodiment.

BEST MODE OF CARRYING OUT THE INVENTION

One embodiment of the present invention will be explained below with reference to the accompanying drawings. First, a CD system samples analog musical signals of two channels with 44.1 KHz and records them as 16-bit digital musical data. With the 16 bits divided into eight bits (one byte) as shown in FIG. 1, the CD-ROM system records digital data with 2352 bytes as one unit (one block).

Figure 1:
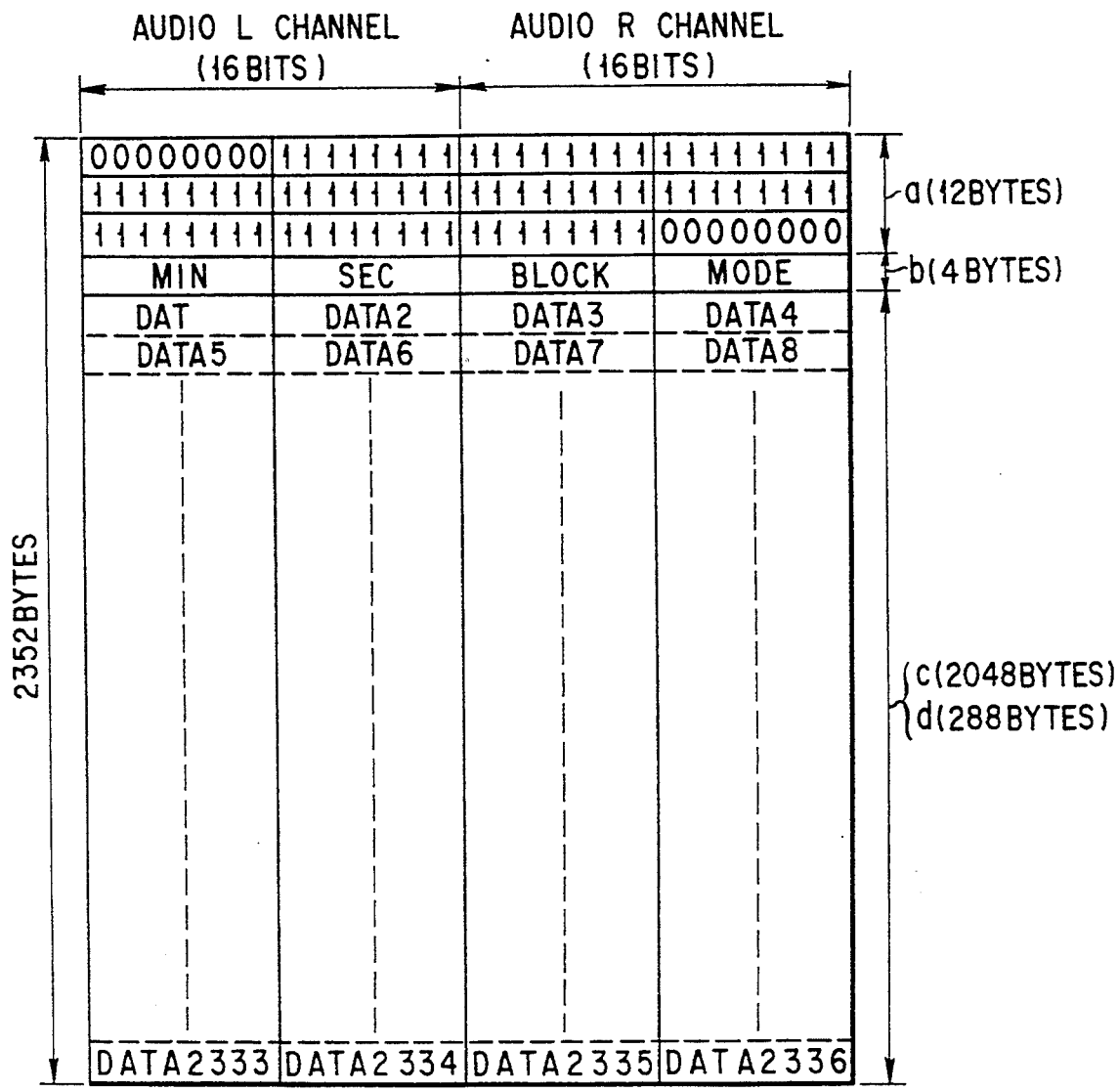
FIG. 1 is a view showing a data format for a CD-ROM system.

The one block comprises, as shown in FIG. 1, a 12-byte synchronizing pattern a for recognizing a start of the block, a 4-byte header address b showing address information in the block corresponding to the aforementioned sub-code Q data, a 2048-byte (=2 k bytes) user data c for a user and a 288-byte error correction data d for performing error detection and error correction of the user data.

Of these, the error correction data d is used in the case where it is not possible to make an error correction simply through the correction of C1, C2 in a CD system recording/reproduction format. The use of the error correction data d improves an error rate up to $10^{-12}$. Viewed from the error rate it can be said that the CD-ROM system has a partially adequate performance as a data recording medium for a computer.

It is to be noted that the aforementioned one block configuration is a format called a MODE-1 and, in addition, there is also another format called a MODE-2 of such a type so as to record the user data c even in the recording area of the error correction data. In the MODE-2 format, the user data c becomes 2336 bytes.

Here, the data transfer rate in the CD-ROM system is 75 blocks/second and, in the case where 1-hour data recording is effected with the MODE-1 format, data of 75 (blocks/second)×60 (minutes)×60 (seconds)×2 (k bytes)=540 M bytes is recorded. This amount of data corresponds to 500 sheets of normal floppy discs and to about 300,000 pages for a document.

Further, the CD-ROM system is excellent even in a replica capability. That is, in the CD-ROM system, its disc is manufactured in the same process as in the existing CD system disc and the manufacturing cost per 1 M byte for the CD-ROM system disc is far lower than the manufacturing cost per 1 M byte of the floppy disc. From this it can be said that it is very suitable for the duplication of the same documents and data.

That is, of those existing recording/reproduction systems using a disc, the CD-ROM system has a great recording capacity and achieves a recording/reproduction system for performing a better duplication at low error rates.

Figure 2:
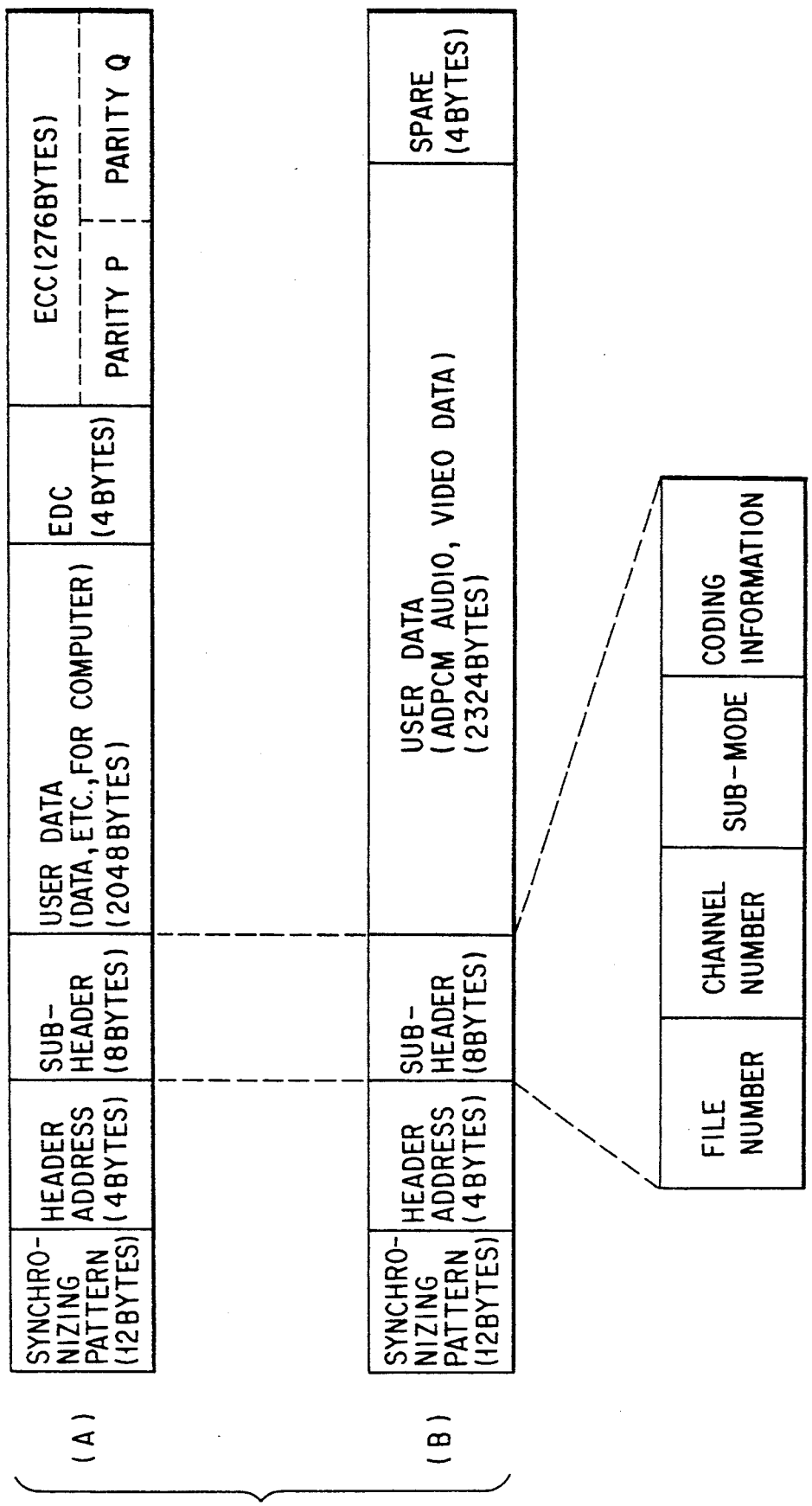
FIG. 2 is a view showing a data format under a CD-ROM.XA standard.

In recent times, a CD-ROM.XA (extended architecture) standard has been announced as a CD-ROM.XA system expansion standard. This CD-ROM.XA standard defines a format for video data and compressed audio data (ADPCM system) recorded in the disc. That is, the data using the CD-ROM.XA standard is recorded in the block of the aforementioned MODE-2 format and defines two forms as shown in FIGS. 2A and 2B.

The audio data is recorded with the ADPCM system, in an interleaved relation and, for a CD system's sampling frequency of 44.1 KHz, the level B of 378 KHz and level C of 18.9 KHz are defined and the compression ratio is 4-fold at the level B (stereo) time and 16-fold at the level C (monaural) time. If, therefore, the audio data is monaural, it is possible to record 16-hour data on one disc.

Further, if the file number and channel number defined in the sub-header are employed, it is possible to make a complex interleaved recording, for example, record a Japanese Language on a channel 1 and on English narration on a channel 2 and reproduce these through momentary switching. Further, interleaved recording can be made between the audio data and video data and, with the video data recorded on channel 1 and audio data recorded on channel 2, it is possible to, while reading the video data, reproduce the audio data.

That is, in the CD-ROM system, the video data is recorded on a data track of the disc and the audio data is recorded on an audio track and audio/video synchronization is achieved through repeated access to both sets of data, while, under the CD-ROM.XA standard, switching between a plurality of languages and simultaneous video display can be made, in real time, without involving an access operation. Though being somewhat degenerated in a sound quality, it is also possible to record long-time duration audio data, as set out above. This is one advantage of the CD-ROM-XA standard.

The CD-ROM drive for making a reproduction on the CD-ROM system disc contains a DAC (digital-to-analog converter) circuit. The audio data of the CD system disc is subjected, by a command of a host PC (personal computer), to processing in the CD-ROM drive for an audio performance to be carried out.

At the present time, a digital data processing system is considered according to which, as shown in FIG. 3, a plurality of CD-ROM drives $15_1, 15_2, \ldots, 15_n$ are connected, via an interface 14 such as an SCSI (small computer system interface) bus, to a host PC 13 to which a display CRT (cathode ray tube) 11 and operation keyboard 12 are connected and the digital audio data selectively obtained from the respective DC-ROM drives $15_1, 15_2, \ldots, 15_n$ prior to being converted by a DAC circuit to an analog one is transferred via the interface 14 to the host PC 13 and subjected to proceeding by an adapter 16 in the host PC 13 for an audio performance to be carried out.

In this case, the adapter 16 comprises an interface control circuit 17 controlling the aforementioned interface 14, a buffer RAM (random access memory) 18 for temporarily storing the digital audio data output from the interface control circuit 17, an ADPCM processor 19 which, when the audio data read out of the buffer RAM 18 is under the CD-ROM.XA standard, subjects it to expansion processing, the DAC circuit 20 for converting the audio data which is output from the ADPCM processor 19 to an analog audio signal, an adapter control circuit 21 for controlling a series of operations of the aforementioned interface control circuit 17, buffer RAM18, ADPCM 19 and DAC circuit 20, and a clock generation circuit 22 for generating a clock necessary for, and supplying it to, the adapter control circuit 21, ADPCM processor 19 and DAC circuit 20.

According to the aforementioned digital data processing system, no DAC circuit is required in the CD-ROM drives $15_1, 15_2, \ldots, 15_n$. It is, therefore, possible to employ an inexpensive CD-ROM without the DAC circuit. Further, a system for incorporating a demodulation circuit into the CD-ROM drive and system for processing, by the adapter, data sent from the CD- ROM drive via the interface in the adapter-equipped host PC are considered as the CD-ROM.XA standard. For the time being, it is predicted that a main-current is toward the latter's system.

In this case, if an adapter is so defined as to have, in addition to the demodulation circuit under the CD-ROM.XA standard, an audio data transfer circuit, it is possible to build an effective system in a simpler configuration. Further, a plurality of CD-ROM drives can be connected to an ordinary interface in which case it is only necessary to provide a signal demodulation circuit, a greater advantage over an adapter type one.

As set out above, in the CD-ROM system and CD-ROM.XA standard, a block is defined as a unit for data reproduction and, for this purpose, a synchronization pattern a is recorded. In the audio data (hereinafter referred to as a CD-DA audio data) reproduced with the CD system, on the other hand, there is no such block concept corresponding to a block as defined under the CD-ROM system and CD-ROM-XA standard. This is because, in the audio data, an audio performance is performed by converting the audio data to a continuous analog data without a break.

Although, in the CD system, the aforementioned subcode Q data is set for address administration, since the address represented by the sub-code Q data strictly does not correspond to actual audio data, it is not possible to simply divide a train of audio data based on the sub-code Q data.

In order to transfer the CD-DA audio data to the host PC 13, it is necessary to define one block size of the data and its addressing in the same way as the CD-ROM system. This is because, in the ordinary interface 14, an address is defined with the use of this block size and a command is sent from the host PC 13 to the CD-ROM drives $15_1, 15_2, \ldots, 15_n$ and data transfer is implemented in a reverse way. That is, a no-break continuous data (infinite length) is not suitable for interface administration.

A marginal block is set even to the CD-DA audio data, but the most convenient definition as the marginary unit is to adopt the same block size (2352 bytes) as under the CD-ROM system and CD-ROM.XA standard. Since the block size corresponds to one frame of the sub-code Q data, one-to-one addressing is basically possible and the same data transfer rate is involved (2352 bytes/block) in all transfer modes under the CD system, CD-ROM system and CD-ROM.XA standard and an advantage is gained by ensuring ready data administration in the adapter 16.

Here it is necessary, upon the transfer of the CD-DA audio data to the host PC 13, to transfer not only the CD-DA audio data but also the sub-code Q data. The subcode Q data contains, in addition to the aforementioned address information, information known as control data. The information contains (1) a flag for recognizing the CD-DA audio data area or CD-ROM data area (containing CD-ROM.XA standard), (2) an emphasis ON/OFF control flag, (3) a 4-ch stereo/2-ch stereo recognition flag and (4) a digital copy inhibit/allow flag, etc.

The afomentioned information labeled (2) and (3) are input to the DAC circuit 20 and muting is applied during a reproduction at the CD-ROM data area by the information labeled (1). In the digital data processing system shown in FIG. 3, the DAC circuit 20 is provided on the host PC 13 side and it is, therefore, necessary to transfer, in addition to the CD-DA audio data, the subcode Q data to the adapter 16.

If, as set out above, the imaginary unit of the CD-DA audio data is set as a 2352-byte unit, this corresponds to a frame frequency (75 Hz) of the sub-code Q data. For this reason, as shown in FIG. 4, an initial block A is set at a given place on a CD-DA audio data and the subsequent blocks B, C, ... are provided for respective 2352 bytes, whereby the CD-DA audio data and sub-code Q data are set in a one-to-one correspondence relation.

In the CD system, an EFM (eight-to-fourteen modulation) demodulation data is synchronized to a clock serving as a reference for reproduction of data generated at a PLL (phase-located loop) circuit, but the clock varies due to the eccentricity of the disc, eccentricity on the CD-ROM drive side, disturbance of a rotation servo of the disc, and so on (this is called a jitter).

At the present time, a RAM aimed at absorbing such a jitter is provided in an audio data processing LSI (Large scale intergrated circuit) which has been widely adopted in the CD player and CD-ROM drive. The EFM demodulation data involving jitters is, once written into the RAM, taken out sequentially in synchronization with a reference clock in the system. That is, the RAM for jitter absorption subjects the EFM demodulation data constantly varying on a time base to data shaping processing free from any variation on the time base.

Generally, a maximum amount of jitter caused in a CD player is about 300 μs on the time base and the aforementioned LSI has a capacity of absorbing a variation up to about 800 μs at max. For this reason, the CD-DA audio data shown in FIG. 4 is reproduced without jitters and there is a time-base variation even at the imaginary block set based thereon.

On the other hand, the sub-code data, after being EFM demodulated, is not written into the jitter absorption RAM and is immediately subjected to necessary processing through simpler error correction processing only. That is, since the sub-code Q data, unlike the CD-DA audio data, is not subjected to any jitter absorption processing, a time-base variation occurs in which case a maximum variation width becomes about 300 μs as set out above.

As explained in FIG. 4, the initially set block A of the CD-DA audio data is in any given position. As shown in FIG. 5, if the initial block A of the CD-DA audio data happens to be set very near the output position of the sub-code Q data (address #1) and the next sub-code Q data (address #2) is shifted toward a longer side, that is a right direction, on the time base, then no address is allocated between the blocks A and B of the CD-DA audio data train, but two addresses #2 and #3 are overwritten in that area between the next block areas B and C.

That is, an address-allocated block and non-address-allocated block are present in the CD-DA audio data and, the non-address-allocated block is dropped out without being naturally transferred, eventually failing to perform a continuous audio performance.

According to the present invention, as will be set out below, it is possible to make a continuous data reproduction in a manner to accurately match the block to an associated address data. First, as already set out above, a maximum amount of variation of the subcode Q data on the time base is normally about 300 μsec. This amount of variation corresponds to about 50-byte time-base variation when data is viewed in terms of the number of bytes. Stated in more detail, as shown in FIG. 6, the synchronizing patterns S1, S2, ... of the sub-code Q data have a maximal amount of variation of ±300 μs relative to an original occurrence position of a respective 1/75 sec cycle.

For this reason, the synchronizing patterns S1, S2, ... of the sub-code Q data occur at an interval of 1/75 (sec)+300 (μs)+300 (μs)=13.93 ms at max, and 1/75 (sec)−300 (μs)−300 (μs)=12.73 ms at min. This namely ensures that during a period from the occurrence of the sub-code Q data until 12.73 ms at min. lapses, no-sub-code Q data emerges.

Figure 7:
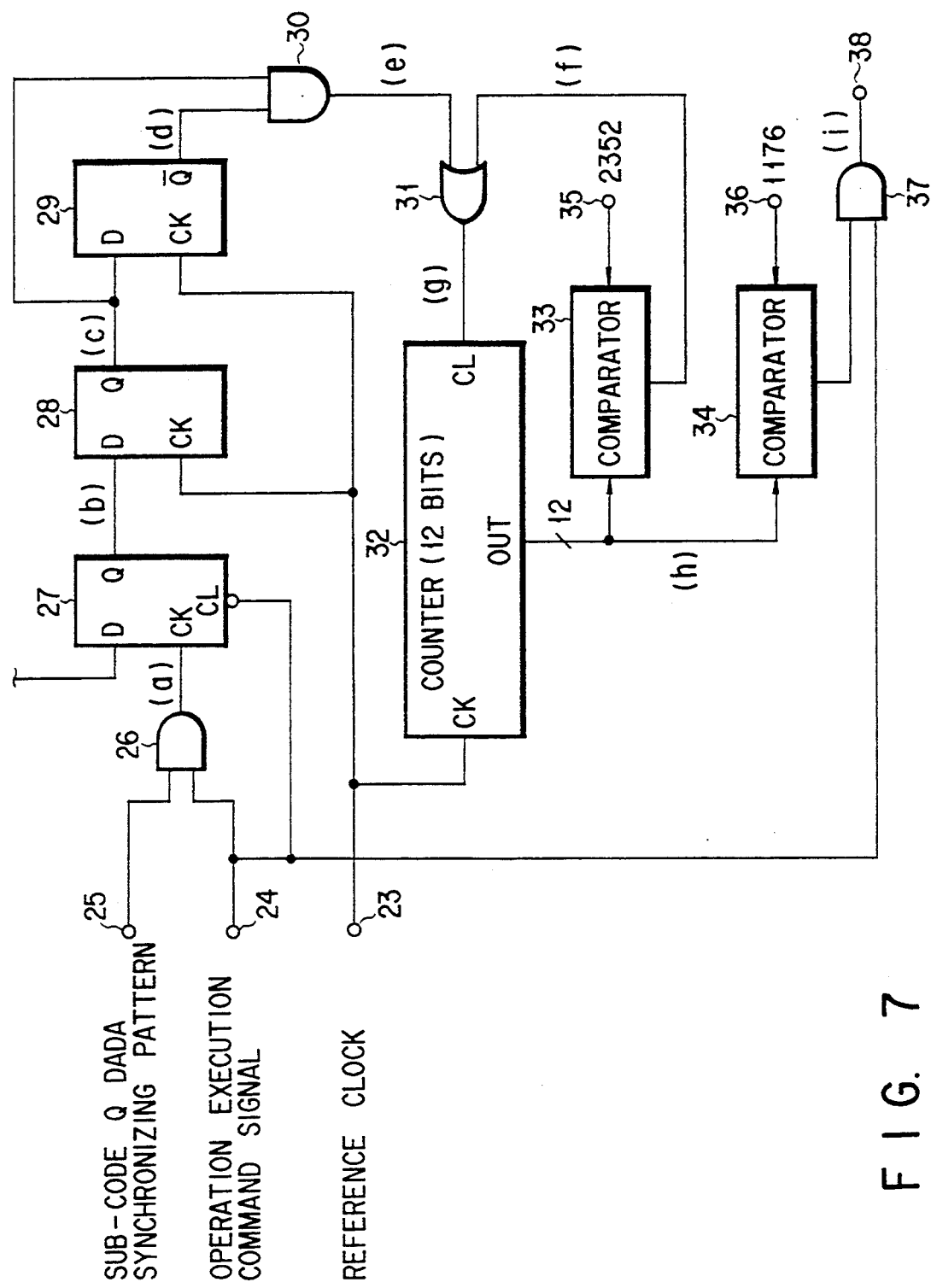
FIG. 7 is a block diagram showing a digital data processing apparatus according to one embodiment of the present invention.
Figure 8:
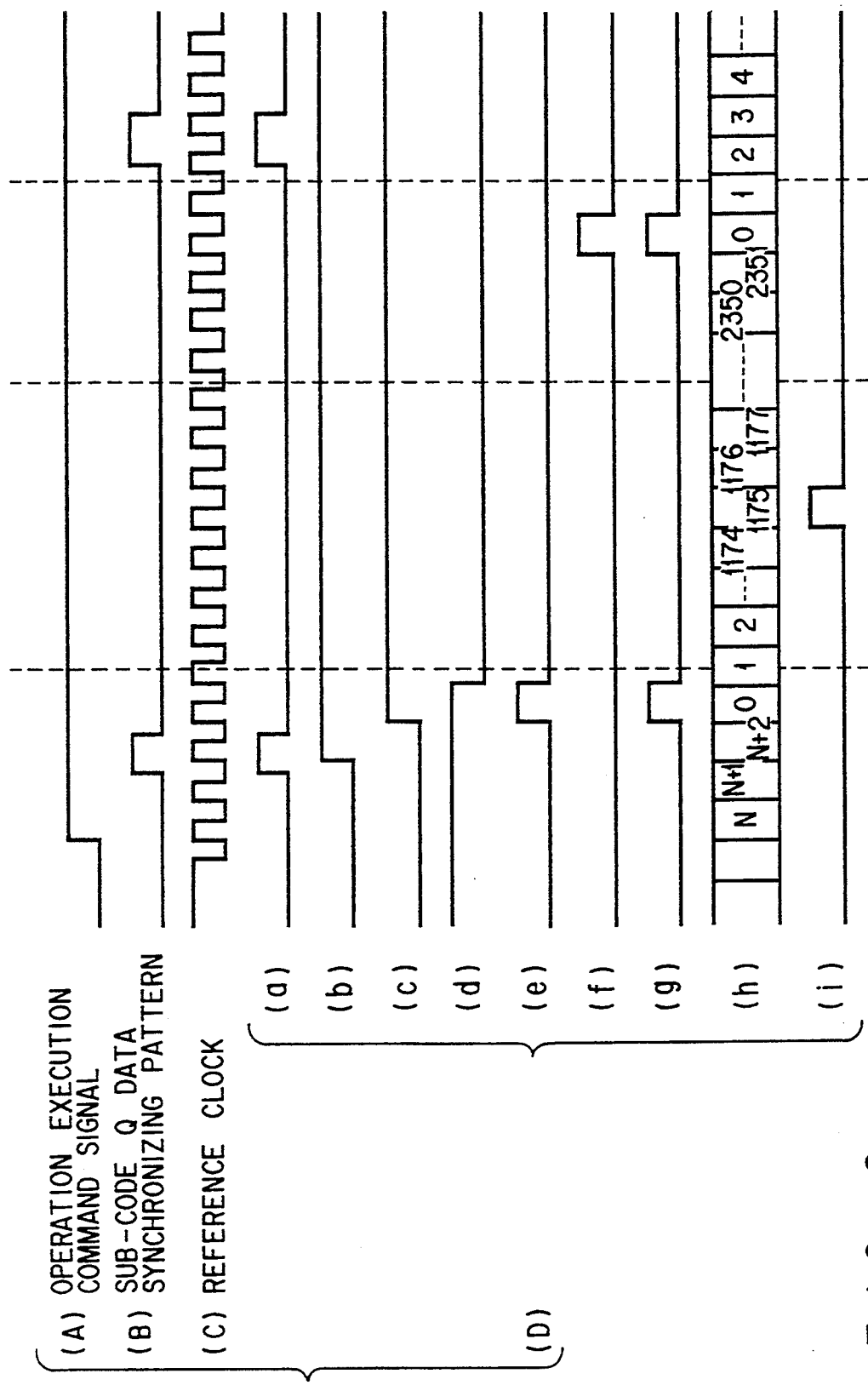
FIG. 8 is a timing chart for explaining the operation of the same embodiment.

With these as a premise, a block arrangement shown in FIG. 7 will be explained below on the basis of a timing chart shown in FIG. 8. First, a start operation is done by inputting a reference clock, that is, a basic system clock for processing 1-byte data of [(1/75)×(1/2352)] to an input terminal 23 and allowing a CPU (central processing unit), not shown, which controls the operation of the CD-ROM drive 151 (CD-ROM $15_2$ to $15_n$) to receive a command from the host PC 13 and to supply a high (H)-level operation execution command signal to an input terminal 24.

when, in this state, the synchronizing pattern of reproduced sub-code Q data is supplied to an input terminal 25, then a pulse corresponding to one cycle of a reference clock is delivered via an AND circuit 26 and D-FF (D type flip-flop) circuits 27, 28 and 29 to an AND circuit 30 where the pulse appears as an output. The output pulse of the AND circuit 30 is supplied via an OR circuit 31 to a clear terminal CL of a 12-bit counter 32 for counting the reference clock. After the operation execution command signal becomes a H level, the counter 32 is reset by the synchronizing pattern of the sub-code Q data initially supplied.

The 12-bit count output from the counter 32 is supplied to each one of input terminals of two comparators 33, 34. A fixed value 2352 corresponding to one block supplied to an input terminal 35 is supplied to the other input terminal of the comparator 33 and a fixed value 1176 corresponding to a ½ block supplied to an input terminal 36 is supplied to the other input terminal of the comparator 34.

When a count value of the counter 32 reaches 1175, a coincidence detection pulse is generated from the comparator 34 and, after being passed through an AND circuit 37, the coincidence detection pulse is taken, as a block signal, out of an output terminal 38. When a count value of the counter 32 reaches 2351, a coincidence detection pulse is generated from the comparator 33 and supplied via on OR circuit 31 to the counter 32 for resetting.

Similarly, thereafter, a block signal is generated when the counter value of the counter 32 reaches 1175 and the counter 32 is cleared when the counter value of the counter 32 reaches a position of 2351. In this way, such an operation is repeated. It is to be noted that, when the counter value of the counter 32 reaches other than 2351, even if the synchronizing pattern of the subcode Q data is supplied to the input terminal 25, the counter 32 is not cleared because the D-FF circuit at the first stage is placed in a set state.

That is, the block signal is generated in a position 1176 bytes from the position of the synchronizing pattern of the sub-code Q data initially obtained and is so generated at a 2352 bytes cycle. Here, the 1176 bytes, upon being taken in terms of time, (1/75)×(½)=6667 μsec, a value for exceeding 300 μs×2=600 μs. This means that, even if jitters occur in the synchronizing pattern of the initial sub-code Q data, the block signal is preset in an ensured range over which the aforementioned sub-code Q data is not generated.

If the synchronizing patterns S1, S2 .... of the sub-code Q data as shown, for example, in FIGS. 6B and 6C are generated, those block signals K1, K2, ... as shown in FIGS. 9 and 10 are generated. Stated in another word, the block signals K1, K2 .... are generated in a manner to maintain, at all times, an order of the sub-code Q data's synchronizing pattern S1, block signal K1, sub-code Q data's synchronizing pattern S2, block signal K2, ....

If, therefore, the sub-code Q data prior to the generation of the block signal is added to the CD-DA audio data, it is possible to prevent a risk that the block of the non-address-allocated CD-DA audio data will be dropped out without being transferred to the host PC 13 or two addresses will be allocated to the same block.

In the aforementioned embodiment, 1176 bytes (=2352/2) was used as the fixed value input from the comparator 34. This is a configuration where right and left jitter margins are most advantageous. As clear from FIGS. 9 and 10, theoretically, the aforementioned order is always maintained, provided that 300 μs×2 to (1/75)sec−(2×300)μs=600 μs to 12.73 ms (106 to 2246 byte positions). For this reason, it may be possible that, for example, of those 12 bit outputs from the counter 32, a 1024 byte position signal is generated for use.

Although, in the aforementioned case, an amount of jitter has been assumed as being ±300 μs, it is needless to say that the range over which the block signal can occur is influenced by the amount of jitter involved. Further, although, as shown in FIGS. 9 and 10, the block signal has been explained as being produced with the synchronizing pattern S1 of the initial sub-code Q data as a reference, the sub-code Q data involves a high error rate because it is subjected to simple error correction processing only. In this case, the block signal is not produced in a correct position. As that countermeasure, if the block signal can occur after the synchronizing pattern of a few sub-code Q data has been identified as occurring in the range of 12.73 ms to 13.93 ms, that is, in the aforementioned theoretical interval, it is possible to build a system of less error operation.

The present invention is not restricted to the aforementioned embodiment and various changes of the invention can be made without departing from the essence of the present invention.

INDUSTRIAL APPLICABILITY

According to the present invention, as set out above in more detail, a much better digital data processing apparatus is provided which can make a continuous data reproduction in an accurate block/address correspondence relation.

I claim:

1. A digital data processing apparatus comprising:
a disc reproduction section for reading digital information from a disc in accordance with a predetermined clock, and for outputting a plurality of blocks of data and the digital information, wherein the digital information includes digital data and address information, the disc reproduction section comprising:
detecting means for receiving the digital information read by the disc reproduction section, for sequentially detecting the address information, and for outputting a detection signal in accordance with the sequentially detected address information; and block signal generating means for receiving the detection signal, for generating, in accordance with a counting of the predetermined clock and the detection signal, a first block signal and subsequent block signals, and for outputting the first block signal and the subsequent block signals, the first block signal being generated at a first predetermined time, the first predetermined time occurring after a predetermined maximum time-base variation caused by a jitter of the sequentially detected address information, the first predetermined time occurring before a second predetermined time which is based upon a predetermined minimum time-base variation, due to the jitter, between the sequentially detected address information, each of the subsequent block signals being generated at a corresponding subsequent predetermined time, each corresponding subsequent predetermined time being equal to the first predetermined time multiplied by a positive odd real integer; and means for receiving the digital information read by the disc reproducing section, the first block signal and the subsequent block signals, and for generating the plurality of blocks of data based upon the digital information, the first block signal, and the subsequent block signals; and a host processing section for receiving the blocks of data and for performing a predetermined data processing operation.

2. The digital data processing apparatus according to claim 1, wherein detecting means also detects an operation execution command signal and generates the detecting signal only when the detecting means detects the operation execution command signal.

3. The digital data processing apparatus according to claim 2, wherein the detecting means further comprises;
coincidence detecting means for detecting a coincidence between the operation execution command signal and a synchronizing pattern corresponding to the address information, and for outputting a coincidence detection signal based upon a detection result of the coincidence detection means; and
latching means for receiving the coincidence detection signal, and for latching the coincidence detection signal.

4. A digital data processing apparatus comprising:
a disc reproduction section for reading digital information from a disc in accordance with a predetermined clock, and for outputting a plurality of blocks of data and the digital information, wherein the digital information includes digital data and address information, the disc reproduction section comprising:
detecting means for receiving the digital information read by the disc reproduction section, for detecting an operation execution command signal, for sequentially detecting the address information when the detecting means detects the operation execution command signal, and for outputting a detection signal in accordance with the sequentially detected address information; and
block signal generating means for generating block signals, the block signal generating means comprising:
a counter for counting a number of clock pulses of the predetermined clock, and for outputting the counted number of clock pulses;
first comparing means for receiving the counted number of clock pulses, for comparing the counted number of clock pulses with a first predetermined number, and for outputting a comparison signal based upon the result of the comparison of the counted number of clock pulses with the first predetermined number, the first predetermined number corresponding to a number of bytes which constitute one of the plurality of blocks of data;
initializing means for receiving the comparison signal and the detection signal, and for initializing the counter based upon one of the comparison signal and the detection signal;
second comparing means for receiving the counted number of clock pulses, for comparing the counted number of clock pulses with a second predetermined number, and for outputting the result of the comparison as one of the block signals, the second predetermined number being greater than a predetermined maximum byte-base variation, caused by a jitter of the sequentially detected address information, the second predetermined number being less than a third predetermined number which is based upon a predetermined minimum byte-base variation, due to the jitter, between the sequentially detected address information; and
means for receiving the digital information read by the disc reproducing section and the block signals, and for generating the plurality of blocks of data based upon the digital information, and the block signals; and a host processing section for receiving the blocks of data and for performing a predetermined data processing operation.

* * * * *